United States Patent
Hsieh et al.

(10) Patent No.: US 7,126,297 B2
(45) Date of Patent: Oct. 24, 2006

(54) CONTROLLING METHOD OF A MOTOR STATE

(75) Inventors: Ting-Chung Hsieh, Taoyuan (TW); Shih-Chieh Liao, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 11/201,433

(22) Filed: Aug. 11, 2005

(65) Prior Publication Data

US 2006/0208688 A1    Sep. 21, 2006

(30) Foreign Application Priority Data

Mar. 16, 2005   (TW) .............................. 94108083 A

(51) Int. Cl.
*H02P 27/04*   (2006.01)

(52) U.S. Cl. ...................................... 318/376; 318/503

(58) Field of Classification Search ................ 318/376, 318/503, 504, 459
See application file for complete search history.

(56) References Cited

U.S. PATENT DOCUMENTS

| | | | | |
|---|---|---|---|---|
| 3,593,103 A | * | 7/1971 | Chandler et al. | 363/174 |
| 4,767,976 A | * | 8/1988 | Mutoh et al. | 318/808 |
| 4,785,225 A | * | 11/1988 | Horie et al. | 318/811 |
| 5,247,237 A | * | 9/1993 | Koyama et al. | 318/808 |
| 6,690,139 B1 | * | 2/2004 | Seibel | 318/798 |

* cited by examiner

*Primary Examiner*—Bentsu Ro

(57) ABSTRACT

A controlling method of a motor state described herein detects the motor operation in a regeneration state or a motor state. The output frequency value of an AC motor drive is calculated and adjusted to stabilize the voltage of a DC bus such that over-voltage protection is avoided. Therefore, a stable load current is obtained and the time for slowing down the motor is shortened.

2 Claims, 5 Drawing Sheets

CONTROLLING METHOD OF A MOTOR STATE

This Non-provisional application claims priority under 35 U.S.C. § 119(a) on Patent Application No(s). 094108083 filed in Taiwan on Mar. 16, 2005, the entire contents of which are hereby incorporated by reference.

BACKGROUND OF THE INVENTION

1. Field of Invention

The invention relates to a motor controlling method and, in particular, to a controlling method of a motor state.

2. Related Art

As the applications of electronic devices become more popular, AC motor drives are used everywhere. FIG. 1 shows a schematic diagram of a DC bus voltage waveform versus the output frequency value when an AC motor drive is used to drive a motor for deceleration control. When the motor is decelerated, its regenerative power causes a rise in the DC bus voltage 10. Therefore, when the DC bus voltage 10 exceeds a over-voltage stall prevention level 11, the AC motor drive has to maintain the output frequency for a certain time 12a without any deceleration action until the DC bus voltage 10 is back to the safe range (i.e. lower than the over-voltage stall prevention level 11). This is to avoid an over-high DC bus voltage 10 that will result in over-voltage protection. A result of such continuous deceleration and speed maintenance is to elongate the motor deceleration time, which is the sum of multiple periods of maintenance time 12a and multiple periods of deceleration time 12b. Moreover, to remove the regenerative power generated when the motor is in a regeneration state, currently there are two solutions. One is to feed the regenerative power back to the power supply via a circuit for further use. However, this method often requires a higher circuit cost. Therefore, people usually adopt the other method, which is to install a braking unit of braking resistor in the device to consume the regenerative power. Although the cost of this method is lower than the previous one, it still requires extra charges for devices and maintenance.

Therefore, how to provide a controlling method that act according to the operation state of a motor is an important subject in the field.

SUMMARY OF THE INVENTION

In view of the foregoing, a primary object of the invention is to provide a controlling method of a motor state. The output frequency value of an AC motor drive is adjusted by detecting the operation state of the motor to waste the regenerative power generated when the motor is operating in a regeneration state. This can reduce the device capacity for the braking unit or braking resistor, achieving the goal of lowering the cost.

In accord with the above object, the disclosed controlling method of a motor state includes the following steps. First, the method detects whether the motor is in a regeneration state or a motor state. When the motor is in the motor state, the AC motor drive sets a time to compute the frequency adjustment according to acceleration and deceleration. When the motor is in the regeneration state, the AC motor drive computes the frequency adjustment to be positive or negative according to a DC bus voltage. When the frequency adjustment is positive, the motor is changed from the regeneration state to the motor state. This avoids a continuously rising DC bus voltage and consumes the regenerative power previously generated by the motor in the regeneration state. Using this controlling method of a motor state, the output frequency value of the AC motor drive is adjusted according to the motor state. This can reduce the device capacity for the braking unit or resistor and thus lower the cost. It also lowers the ripple voltage of the DC bus and obtains a more stable load current.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 2:
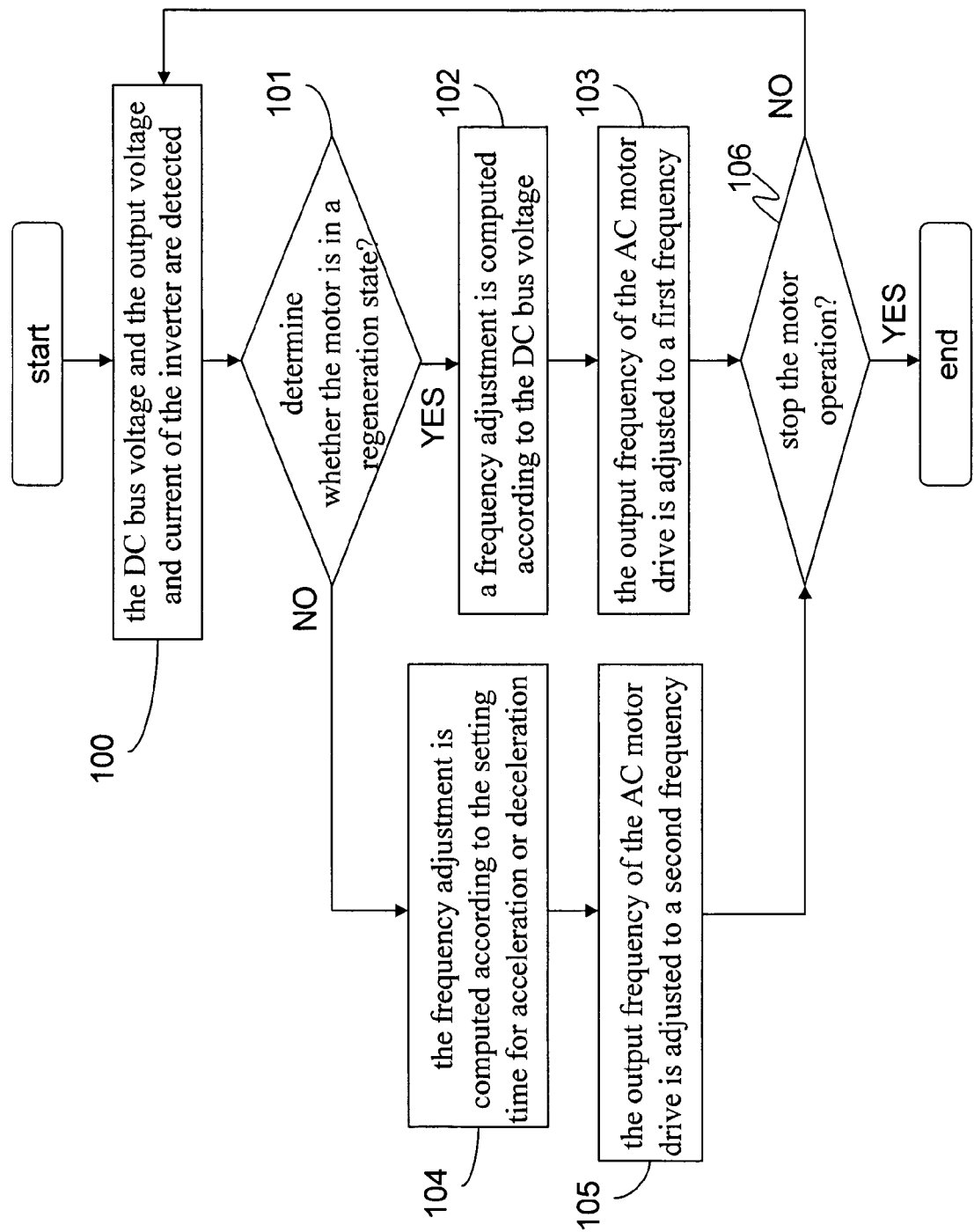
FIG. 2 is a flowchart showing the steps of controlling the motor operation state according to the invention.

The operation flowchart of the disclosed controlling method is shown in FIG. 2. First, the DC bus voltage and the output voltage and current of the AC motor drive are detected (step 100) to determine whether the motor is in a regeneration state (step 101). If the motor is in the regeneration state, there is the energy back-rise problem. In this case, a frequency adjustment is computed according to the DC bus voltage (step 102).

The output frequency of the AC motor drive is adjusted to a first frequency (step 103), which is the sum of the output frequency of the AC motor drive and the frequency adjustment. The frequency adjustment is obtained according to the DC bus voltage and can be either positive or negative. When the frequency adjustment is positive, the motor is changed form the regeneration state to the motor state to prevent the DC bus voltage from rising and to consume the regenerative power generated by the motor in the regeneration state.

If the motor is not in the regeneration state, it is in the motor state. There is no energy back-rise problem. The frequency adjustment is computed according to the setting time for acceleration or deceleration (step 104).

Afterwards, the output frequency of the AC motor drive is adjusted to a second frequency (step 105), which is the sum of the output frequency of the AC motor drive and the frequency adjustment that is obtained according to the setting time for acceleration and deceleration. After steps 103 and 105, the method determines whether to stop the motor operation (step 106). If the motor still has to be operating, then the procedure goes back to step 100 for further control.

Figure 1:
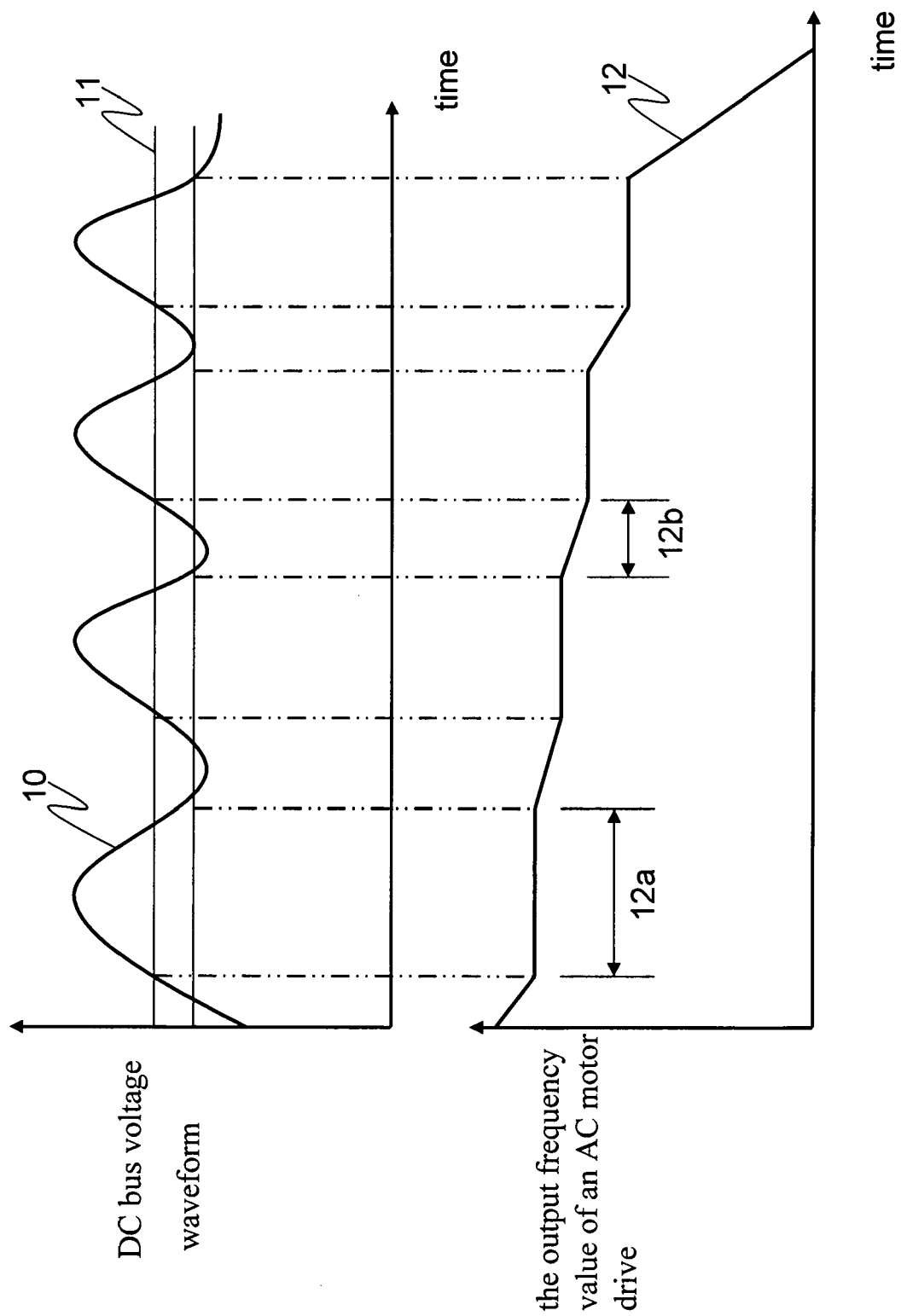
FIG. 1 is a schematic view showing the DC bus voltage and the AC motor drive output frequency when a motor in the prior art is decelerating.
Figure 3A:
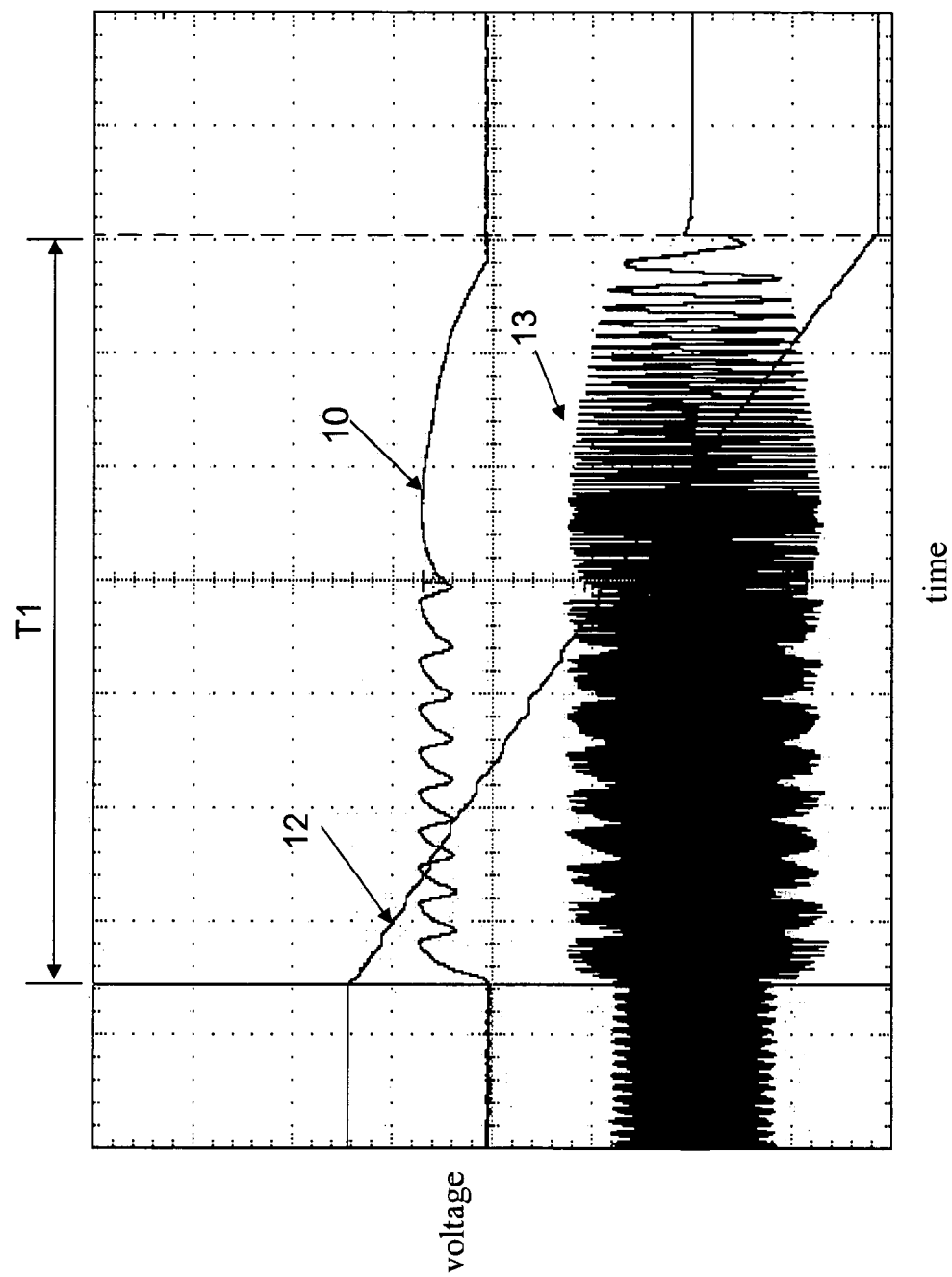
FIG. 3A is a schematic view of a simulated waveform in the prior art.
Figure 3B:
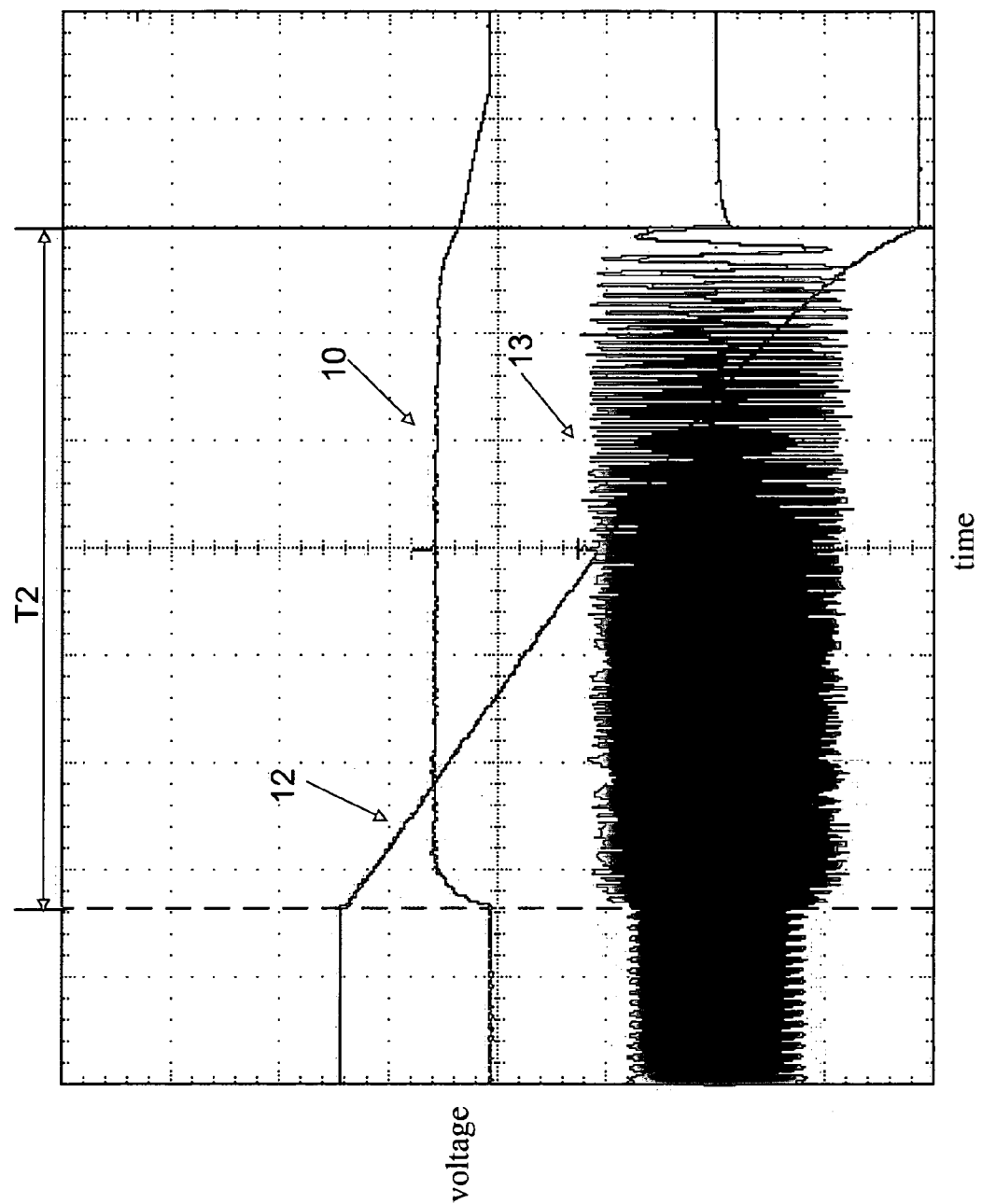
FIG. 3B is a schematic view of a simulated waveform of the invention.

Please refer to FIGS. 3A and 3B. As shown in FIG. 3A, the DC bus voltage 10 makes the motor in a regeneration state due to deceleration or load variation, thus resulting in the energy back-rise problem. The waveform of the DC bus voltage 10 varies too much. To avoid an over-high DC bus voltage 10, the output frequency 12 has to be kept constant once the DC bus voltage 10 exceeds an over-voltage stall prevention level 11 (see FIG. 1). The output frequency 12 is controlled to provide deceleration when the DC bus voltage 10 is below the over-voltage stall prevention level 11. Since the DC bus voltage 10 has to be prevented from being too high during the whole deceleration process, the deceleration time T1 is longer. The load current 13 varies with the DC bus voltage 10, resulting in a very large variation. With reference to FIG. 3B, when the motor is detected in the regeneration state, the output frequency 12 is computed and adjusted accordingly to change the motor from the regeneration state to the motor state to avoid the DC bus voltage 10 from rising indefinitely and to consume the regenerative power. It is found that the output frequency 12 does not experience any maintenance stage. Therefore, the deceleration time T2 (about 6.34 seconds) is shorter than the deceleration T1 (about 6.60 seconds). The DC bus voltage has a smoother waveform, and the load current 13 is more stable.

Figure 4:
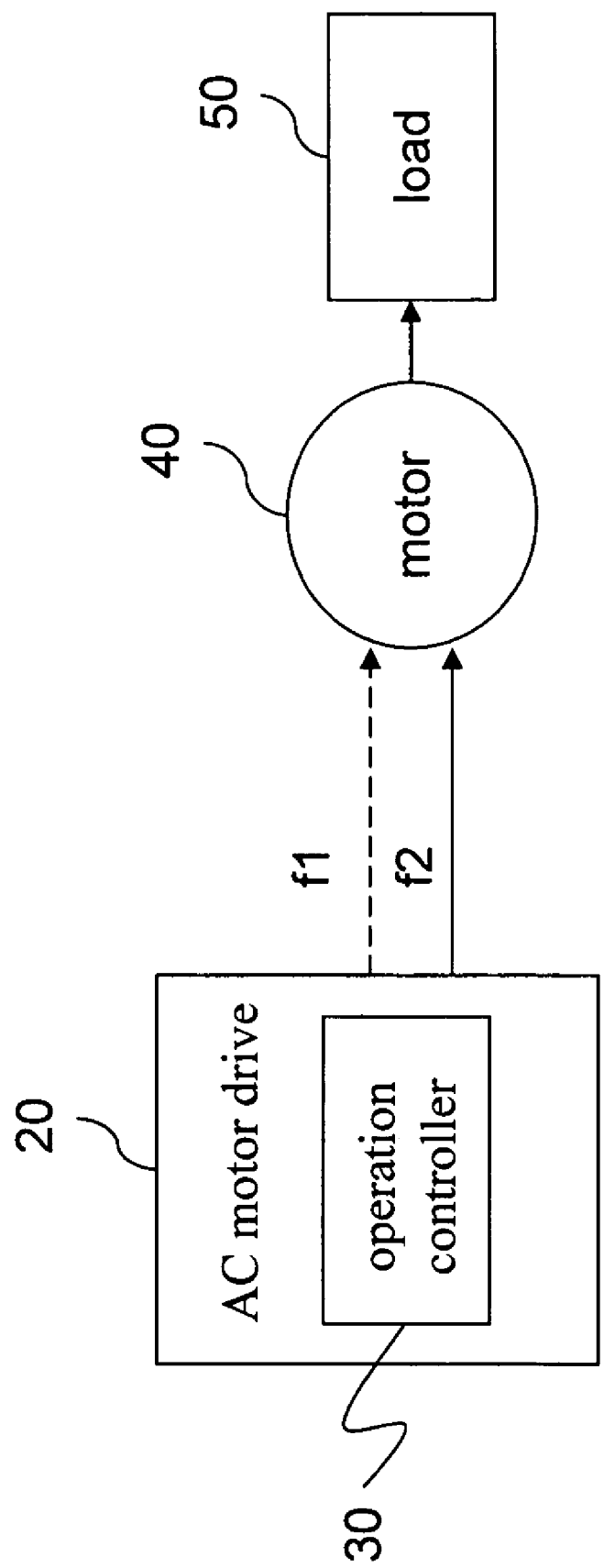
FIG. 4 is a system block diagram of the invention.

The system block diagram given in FIG. 4 shows that the AC motor drive 20 is installed with an operation controller 30. The output frequency f1 of the AC motor drive 20 drives the motor 40. When the load 50 varies or decelerates, the AC motor drive 20 determines whether the motor 40 is in the regeneration state according to the voltage along with the output voltage and current of the DC bus. The operation control frequency f2 is computed and output by the operation controller 30, so that the motor 40 changes from the regeneration state to the motor state. This can consume the regenerative power generated because the motor 40 is in the regeneration state and prevent the DC bus voltage from rising indefinitely. Moreover, the operation controller 30 can be installed outside the AC motor drive 20 without affecting the operations and functions.

According to the controlling method of a motor state, the operation state of a motor is checked to adjust the output frequency of a AC motor drive so that the motor does not encounter the regenerative power problem when it is decelerating or its load is varying while in the regeneration state. Therefore, both the DC bus voltage and the load current become more stable. Moreover, the motor deceleration time is shorter.

Certain variations would be apparent to those skilled in the art, which variations are considered within the spirit and scope of the claimed invention.

What is claimed is:

1. A controlling method of a motor state that adjusts an output frequency of an AC motor drive to control an operation state of the motor, comprising the steps of:
    determining the operation state of the motor;
    driving the motor according to a first frequency to change the operation state of the motor into a motor state;
    adjusting the output frequency to a second frequency when the motor is in the motor state, wherein the second frequency is the sum of the output frequency and a frequency adjustment, and the frequency adjustment is computed according to a setting time for acceleration; and
    driving the motor according to the second frequency.

2. A controlling method of a motor state that adjusts an output frequency of an AC motor drive to control an operation state of the motor, comprising the steps of:
    determining the operation state of the motor;
    driving the motor according to a first frequency to change the operation state of the motor into a motor state;
    adjusting the output frequency to a second frequency when the motor is in the motor state wherein the second frequency is the sum of the output frequency and a frequency adjustment, and the frequency adjustment is computed according to a setting time for deceleration; and
    driving the motor according to the second frequency.

* * * * *